United States Patent
Lee et al.

(10) Patent No.: US 9,630,517 B2
(45) Date of Patent: Apr. 25, 2017

(54) UNMANNED AERIAL VEHICLE, CHARGING STATION, AND AUTOMATIC CHARGING SYSTEM FOR UNMANNED AERIAL VEHICLE INCLUDING THE SAME

(71) Applicant: Defense Agency For Technology And Quality, Seoul (KR)

(72) Inventors: Ki Young Lee, Gyeongsangnam-do (KR); Ki Jung Kang, Chungcheongbuk-do (KR)

(73) Assignee: Defense Agency for Technology and Quality, Seoul (KR)

( * ) Notice: Subject to any disclaimer, the term of this patent is extended or adjusted under 35 U.S.C. 154(b) by 175 days.

(21) Appl. No.: 14/644,260

(22) Filed: Mar. 11, 2015

(65) Prior Publication Data

US 2016/0200207 A1    Jul. 14, 2016

(30) Foreign Application Priority Data

Jan. 13, 2015    (KR) .................. 10-2015-0006039

(51) Int. Cl.
*H02J 7/00*     (2006.01)
*B60L 11/18*     (2006.01)
(Continued)

(52) U.S. Cl.
CPC ....... *B60L 11/1824* (2013.01); *B60L 11/1816* (2013.01); *B64C 25/32* (2013.01); *B64C 39/024* (2013.01); *B64C 2025/325* (2013.01); *B64C 2201/024* (2013.01); *B64C 2201/027* (2013.01); *B64C 2201/042* (2013.01); *B64C 2201/066* (2013.01)

(58) Field of Classification Search
CPC ... Y02T 90/14; Y02T 10/7005; Y02T 90/128; Y02T 10/7088; Y02T 90/163
USPC ........................................................ 320/109
See application file for complete search history.

(56) References Cited

U.S. PATENT DOCUMENTS 6,450,448 B1 *   9/2002   Suzuki ................. B64C 25/405
                                                       244/100 R
9,139,310 B1 *   9/2015   Wang ........................ B64F 1/36
(Continued)

FOREIGN PATENT DOCUMENTS

KR    1020120077174     7/2012
KR    1020140078251     6/2014

OTHER PUBLICATIONS

Korean Patent Office, Office Action issued on Jun. 15, 2015 against the corresponding Korean Patent Application No. 10-2015-0006039 without an English Translation.

*Primary Examiner* — Arun Williams
(74) *Attorney, Agent, or Firm* — Hammer & Associates, P.C.

(57) ABSTRACT

Disclosed are an unmanned aerial vehicle, a charging station, and an automatic charging system for an unmanned aerial vehicle including the same. The unmanned aerial vehicle includes: a main body which includes a plurality of rotors, and is capable of flying and vertical taking off and landing by the rotors; a battery which is mounted in the main body for supplying power and is chargeable; a landing gear which includes a first charging terminal and a second charging terminal having different polarities and electrically connected to the battery, and is provided at a lower part of the main body; and a controller configured to control the main body.

5 Claims, 4 Drawing Sheets

(51) Int. Cl.
*B64C 39/02* (2006.01)
*B64C 25/32* (2006.01)

(56) References Cited

U.S. PATENT DOCUMENTS

| | | | |
|---|---|---|---|
| 2001/0049249 A1* | 12/2001 | Tachau | A63H 17/34 446/397 |
| 2015/0097530 A1* | 4/2015 | Scarlatti | B60L 11/1827 320/109 |
| 2016/0257424 A1* | 9/2016 | Stabler | A63H 27/12 |

\* cited by examiner

UNMANNED AERIAL VEHICLE, CHARGING STATION, AND AUTOMATIC CHARGING SYSTEM FOR UNMANNED AERIAL VEHICLE INCLUDING THE SAME

TECHNICAL FIELD

The present invention relates to an unmanned aerial vehicle, a charging station, and an automatic charging system for an unmanned aerial vehicle including the same.

BACKGROUND ART

An unmanned aerial vehicle is used for aerial photography, surveillance and reconnaissance, freight transportation, fire watch, lifesaving, and the like. The aerial vehicle is operated by an electric propulsion scheme using a secondary battery. However, since a flight time is several tens of minutes, which are short, due to a limit of an energy density of the secondary battery, utility of the unmanned aerial vehicle is limited.

SUMMARY OF THE INVENTION

The present invention has been made in an effort to provide an automatically chargeable unmanned aerial vehicle, a charging station, and an automatic charging system for an unmanned aerial vehicle including the same.

The present invention has also been made in an effort to provide an unmanned aerial vehicle, which is capable of continuously performing a task through an automatic charging system, a charging station, and an automatic charging system for an unmanned aerial vehicle including the same.

The present invention has also been made in an effort to provide a system for automatically charging a secondary battery of an electric unmanned aerial vehicle (or an unmanned flying device) performing automatic landing based on the Global Navigation Satellite System, such as GPS, or an image based automatic landing method, and a method using the same, and provide an automatic charging system, which overcomes a flight time limit of the unmanned aerial vehicle to enable the unmanned aerial vehicle to continuously fly for a long time.

An exemplary embodiment of the present invention provides an unmanned aerial vehicle, including: a main body which includes a plurality of rotors, and is capable of flying and vertical taking off and landing by the rotors; a battery which is mounted in the main body for supplying power and is chargeable; a landing gear which includes a first charging terminal and a second charging terminal having different polarities and electrically connected to the battery, and is provided at a lower part of the main body; and a controller configured to control the main body.

Another exemplary embodiment of the present invention provides a charging station for charging the unmanned aerial vehicle, including: a first plate, on which the landing gear of the unmanned aerial vehicle is seated, and which is to be electrically connected with the first charging terminal; a second plate, which is spaced apart from the first plate at a predetermined interval, and is to be electrically connected with the second charging terminal of the unmanned aerial vehicle passing through the first plate; and a micom configured to supply power to each of the plates while the unmanned aerial vehicle is charged.

Yet another exemplary embodiment of the present invention provides a system for automatically charging an unmanned aerial vehicle, including an unmanned aerial vehicle; and a charging station configured to charge the unmanned aerial vehicle.

Here, the unmanned aerial vehicle may include: a main body which includes a plurality of rotors, and is capable of flying and vertical taking off and landing by the rotors; a battery which is mounted in the main body for supplying power and is chargeable; a landing gear which includes a first charging terminal and a second charging terminal having different polarities and electrically connected to the battery, and is provided at a lower part of the main body; and a controller configured to control the main body.

The charging station may include: a first plate, on which the landing gear of the unmanned aerial vehicle is seated, and which is to be electrically connected with the first charging terminal; a second plate, which is spaced apart from the first plate at a predetermined interval, and is to be electrically connected with the second charging terminal of the unmanned aerial vehicle passing through the first plate; and a micom configured to supply power to each of the plates while the unmanned aerial vehicle is charged.

When a voltage of the battery is equal to or smaller than a predetermined voltage, the controller may control the unmanned aerial vehicle to be returned to the charging station.

The controller may vertically land the unmanned aerial vehicle onto the charging station based on at least one element of position information about the charging station and image information about the charging station.

The first charging terminal may be provided on a bottom surface of the landing gear, and second charging terminal may be provided to be accommodated inside the landing gear or protrude to the outside of the landing gear by a driving unit.

Here, when the landing gear is in contact with the first plate, the controller may control the second charging terminal to protrude to the outside of the landing gear so that the second charging terminal is in contact with the second plate.

The charging station may further include a proximity sensor configured to detect the unmanned aerial vehicle, in which when landing of the unmanned aerial vehicle is detected, the micom may supply power to each of the plates.

As described above, the unmanned aerial vehicle, the charging station, and the automatic charging system for an unmanned aerial vehicle including the same according to the exemplary embodiment of the present invention have the following effects.

When a voltage of a battery (secondary battery) of the unmanned aerial vehicle is dropped to a predetermined level or lower, the controller of the unmanned aerial vehicle returns to a charging station, from which the unmanned aerial vehicle initially takes off, or a charging station on a pre-designated or moving vehicle or vessel to automatically perform vertical landing. Further, the controller of the unmanned aerial vehicle connects a charging terminal to the charging station to perform charging, and the unmanned aerial vehicle automatically vertically takes off after the charging to continuously perform a given task.

The unmanned aerial vehicle may continuously perform a task for 24 hours while repeating task performance, vertical takeoff and landing, charging, and stand-by as necessary.

When the present system is used, flight time is remarkably increased by automatically charging the battery of the unmanned aerial vehicle, so that it is possible to continuously operate the unmanned aerial vehicle if there is no problem during flight, and thus the unmanned aerial vehicle may continuously perform a task for 24 hours. Further, the battery of the unmanned aerial vehicle is automatically charged, so that a manual operation, such as changing the battery, is not required, thereby decreasing labor costs and automatizing a task of the unmanned aerial vehicle.

DETAILED DESCRIPTION

Figure 1:
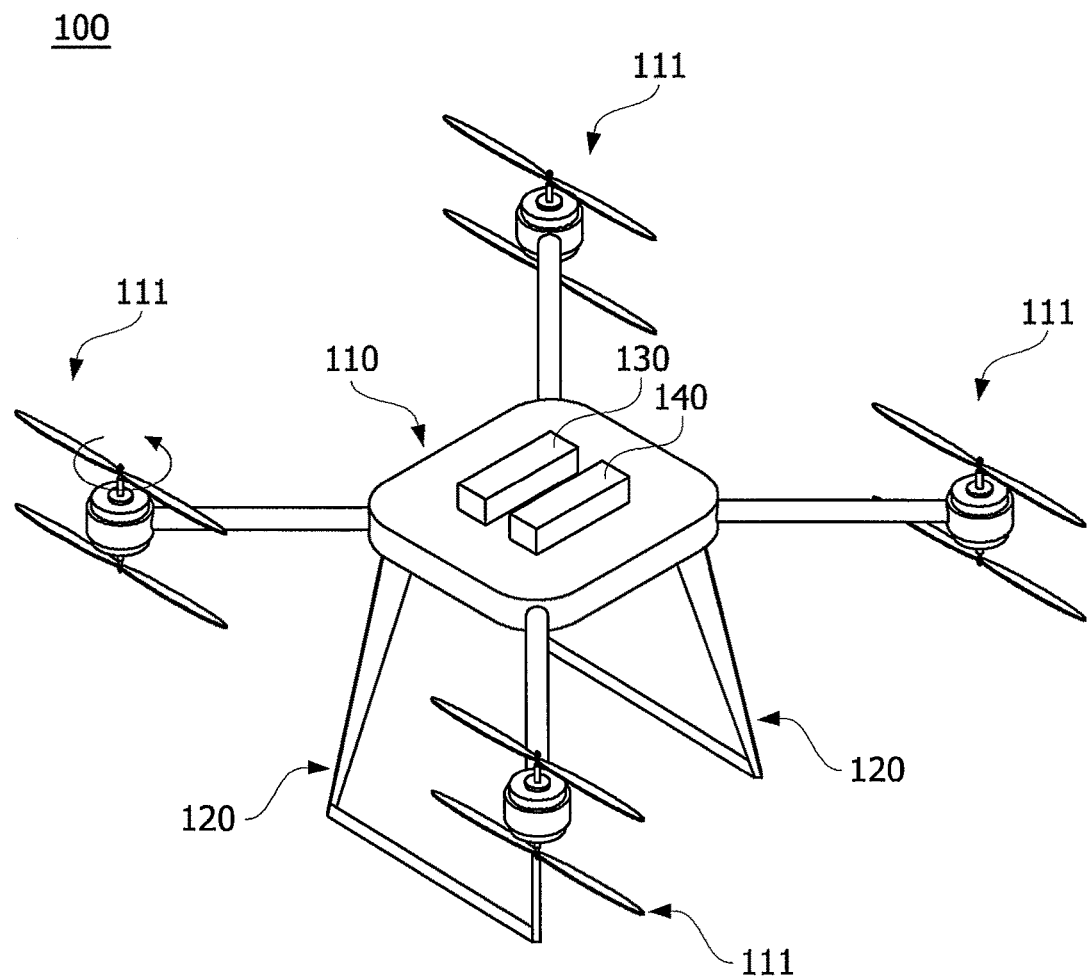
FIG. 1 is a perspective view of an unmanned aerial vehicle according to an exemplary embodiment of the present invention.

Hereinafter, an unmanned aerial vehicle, a charging station, and an automatic charging system for an unmanned aerial vehicle including the same according to an exemplary embodiment of the present invention will be described in detail with reference to the accompanying drawings.

The same or similar reference numeral is assigned to the same or corresponding constituent element, regardless of a reference numeral, and a repeated description thereof will be omitted, and a size and a shape of each illustrated constituent member may be exaggerated or decreased for convenience of description.

Figure 2:
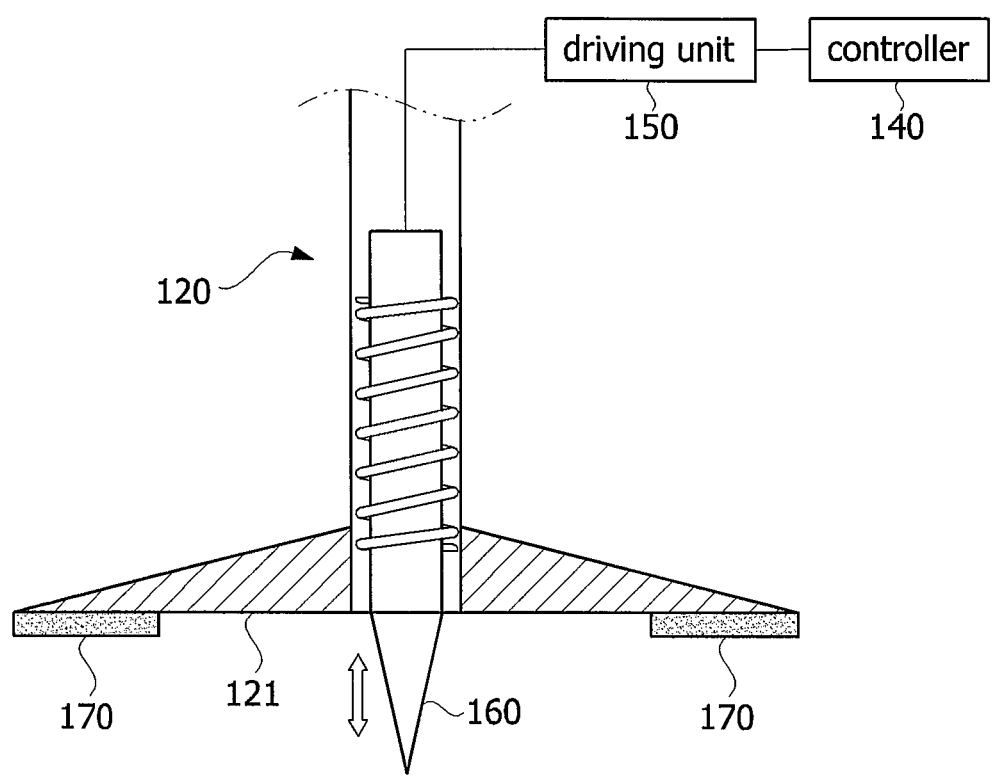
FIG. 2 is a cross-sectional view of a principal part of a landing gear of the unmanned aerial vehicle illustrated in FIG. 1.

FIG. 1 is a perspective view of an unmanned aerial vehicle according to an exemplary embodiment of the present invention, and FIG. 2 is a cross-sectional view of a principal part of a landing gear of the unmanned aerial vehicle illustrated in FIG. 1.

Figure 3:
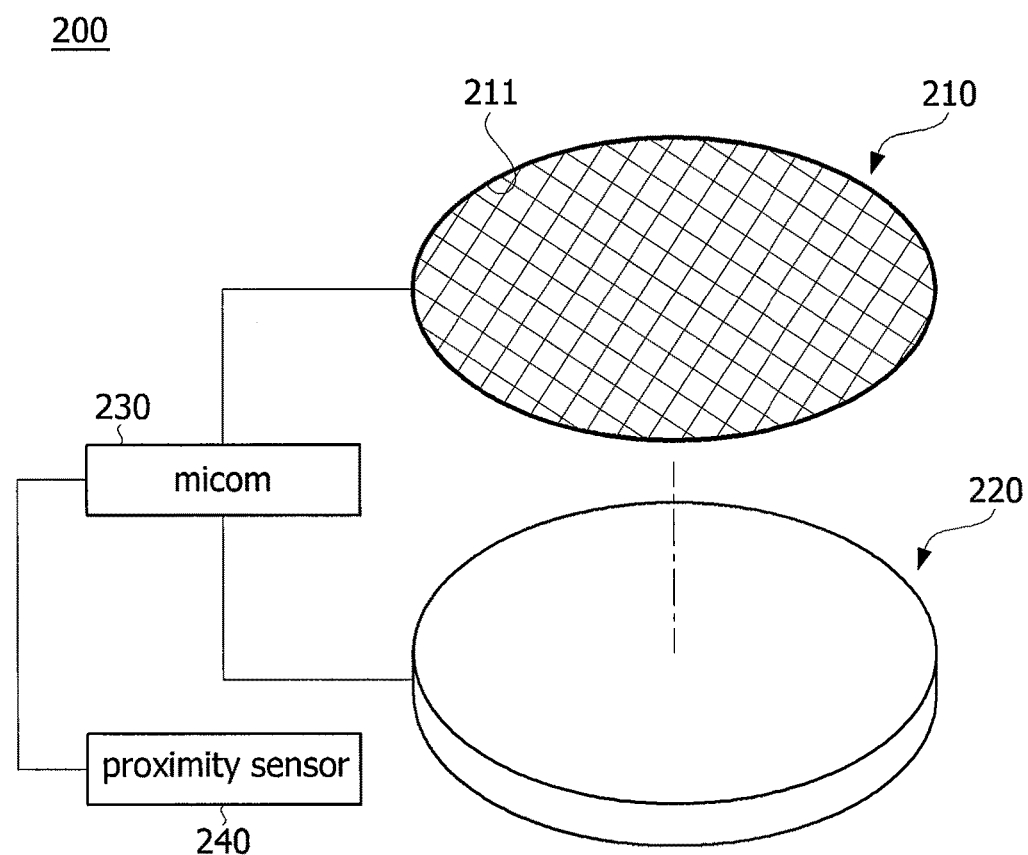
FIG. 3 is a perspective view of a principal part of a charging station according to the exemplary embodiment of the present invention.
Figure 4:
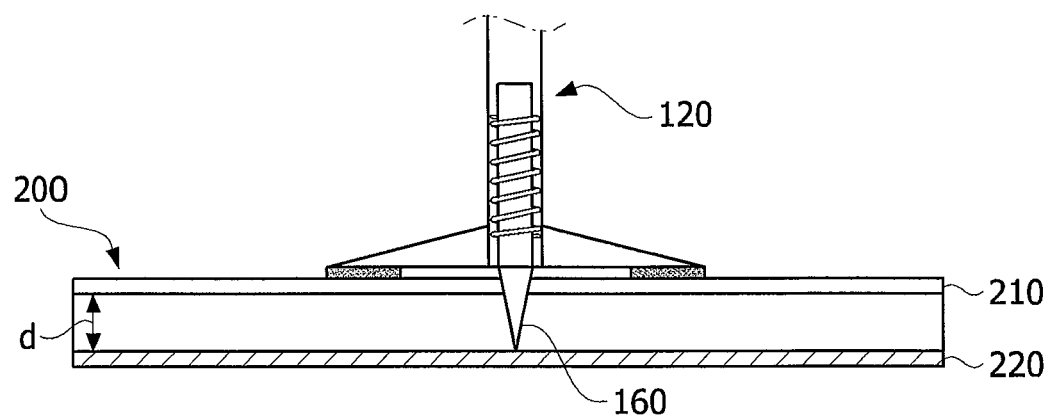
FIG. 4 is a cross-sectional view for describing an electric connection state between the unmanned aerial vehicle and the charging station.

FIG. 3 is a perspective view of a principal part of a charging station according to the exemplary embodiment of the present invention, and FIG. 4 is a cross-sectional view for describing an electric connection state between the unmanned aerial vehicle and the charging station.

The landing gear 120 has a first charging terminal 170 and a second charging terminal 160 having different polarities and electrically connected to the battery 130. That is, the plurality of charging terminals 170 and 160 for charging the battery 130 through an external power supply (for example, a charging station) is provided at the landing gear 120. Further, when each charging terminal is electrically connected with the charging station 200, the charging of the battery 130 is performed. In the meantime, a charge protection circuit may be embedded in the battery 130. Accordingly, it is possible to prevent overcharging, overdischarging, a short circuit, and the like when the battery 130 is charged.

In the meantime, one or more charging terminals may be provided so as to be accommodated inside the landing gear 120 by a driving unit 150 or protrude to the outside of the landing gear 120. For example, one or more charging terminals (for example, the second charging terminal 160) may be provided so as to be located inside the landing gear 120 without protruding to the outside of the landing gear 120 while the unmanned aerial vehicle 100 flies. Further, one or more charging terminals (for example, the second charging terminal 160) may be provided so as to protrude to the outside of the landing gear 120 only when the unmanned aerial vehicle 100 is charged. Particularly, referring to FIG. 2, the first charging terminal 170 may be provided on a bottom surface 121 of the landing gear 120. Further, the second charging terminal 160 may be provided to be accommodated inside the landing gear 120 or protrude to the outside of the landing gear 120. Further, the second charging terminal 160 may have a pin shape.

In the meantime, a push switch may be provided at the landing gear 120. The push switch may be provided so as to detect a takeoff state and a landing state of the landing gear 120. For example, when the landing gear 120 is seated (in contact with or landed) on the charging station 200, the push switch may detect the seat. Further, when the landing gear 120 is separated (for example, takes off) from the charging station 200, the push switch may detect the separation. The push switch may be implemented by various sensors, and may include, for example, a pressure sensor and a proximity sensor.

Here, when the landing gear 120 is in contact with the charging station 200, the controller 140 may control the driving unit 150 so that the second charging terminal 160 protrudes to the outside of the landing gear 120. By contrast, when the landing gear 120 is separated from the charging station 200, the controller 140 may control the driving unit 150 so that the second charging terminal 160 is accommodated inside the landing gear 120. Here, the driving unit 150 may include a servo motor.

Referring to FIGS. 3 and 4, the charging station 200 according to the exemplary embodiment of the present invention is a charging device for charging the aforementioned unmanned aerial vehicle 100.

The charging station 200 includes a first plate 210, on which the landing gear 120 of the unmanned aerial vehicle 100 is seated, for electrically connecting the charging station 200 with the first charging terminal 170. Further, the charging station 200 includes a second plate 200 spaced apart from the first plate 210 at a predetermined interval d, for electrically connecting the charging station 200 with the second charging terminal 160 of the unmanned aerial vehicle 100 passing through the first plate 210. Further, the charging station 200 includes a micom 230 for supplying power to the respective plates 210 and 220 for charging the unmanned aerial vehicle 100.

Power with a different polarity is supplied to each of the first and second plates 210 and 220 while the unmanned aerial vehicle 100 is charged. Further, the first plate 210 includes a plurality of through-holes 211, through which the second charging terminal 160 passes. For example, the first plate 210 may be a mesh plate. As described above, when the landing gear 120 is seated on the first plate 210, the first charging terminal 170 is in contact with the first plate 210, and the push switch transmits a landing detecting signal to the controller 140. Here, the controller 140 controls the driving unit 150 so that the second charging terminal 160 protrudes to the outside of the landing gear 120 toward the second plate 220. For example, the second charging terminal 160 may protrude to the outside of the landing gear 120 by the interval d between the first plate 210 and the second plate 220. In the aforementioned structure, the first charging terminal 170 is physically/electrically connected with the first plate 210, and the second charging terminal 160 is physically/electrically connected with the second plate 220. For example, the first charging terminal 170 and the first plate may have a positive (+) electrode, and the second charging terminal 160 and the second plate may have a negative (−) electrode.

The charging station 200 may additionally include a proximity sensor 240 for detecting the unmanned aerial vehicle 100. Here, when the micom 203 detects the landing (proximity) of the unmanned aerial vehicle 100, the micom 230 may supply power to each of the plates 210 and 220. In the meantime, a predetermined mark for guiding the landing of the unmanned aerial vehicle 100 may be indicated on the first plate 210, which will be described below.

In the automatic charging system for the unmanned aerial vehicle, the controller 140 of the unmanned aerial vehicle 100 controls the main body 110 to be returned to the charging station 200 when a voltage of the battery 130 is equal to or smaller than a predetermined voltage. Further, the controller 140 vertically lands the main body on the charging station based on at least one element of position information (for example, GPS information) about the charging station 200 and image information (for example, the mark of the first plate) about the charging station 200.

As described above, the first charging terminal 170 is provided on the bottom surface 121 of the landing gear 120. Further, the second charging terminal 160 may be provided to be accommodated inside the landing gear 120 or protrude to the outside of the landing gear 120 by the driving unit 150. Here, when the landing gear 120 is in contact with the first plate 210, the controller 140 controls the second charging terminal 160 to protrude to the outside of the landing gear 120 so as to make the second charging terminal 160 be in contact with the second plate 220. Further, the charging station 200 includes the proximity sensor 240 for detecting the unmanned aerial vehicle 100, and when the landing of the unmanned aerial vehicle 100 is detected, the micom 230 supplies power to each of the plates 210 and 220.

Hereinafter, a method of automatically charging an unmanned aerial vehicle will be described in detail. Structures of the unmanned aerial vehicle 100 and the charging station 200 configuring the automatic charging system for the unmanned aerial vehicle are the same as those described above.

When a voltage of the secondary battery 130 that is a power source is decreased to a predetermined level or lower while the unmanned aerial vehicle 100 performs a task, a mounted flight control computer (controller) gives an inducement command for returning the unmanned aerial vehicle 100 to the charging station 200, and performs automatic landing. In this case, a method of docking to the charging station 200 while the unmanned aerial vehicle 100 is automatically landed may include the Global Navigation Satellite System, such as a GPS, an image based automatic landing method, and the like.

The automatic landing using the image information may adopt an algorithm for calculating information on a distance to a landing target point by using a feature point (for example, a mark) of the image. The unmanned aerial vehicle 100 returns to the charging station 200, which the unmanned aerial vehicle 100 initially takes off, or the charging station 200 on a pre-designated or moving vehicle or vessel to perform automatic vertical landing. When the unmanned aerial vehicle 100 is landed, a landing state signal is generated by the push switch, and the charging terminal (the second charging terminal) is in contact with the second plate 220 of the charging station 200 while the charging terminal (the second charging terminal) comes down from an inner side of the landing gear 120 by a servo motor. Further, the charging station 200 may detect the landing of the unmanned aerial vehicle 100 by the proximity sensor 240 to activate charging power. Further, the charging protection circuit is embedded in the secondary battery 130, so that it is possible to prevent overcharging, overdischarging, a short circuit, and the like while the secondary battery 130 is charged.

When the charging is completed and the voltage of the secondary battery reaches a predetermined level, the unmanned aerial vehicle 100 stands by a task or performs automatic landing according to a command of the flight controller (controller) and continuously performs a task. When the unmanned aerial vehicle 100 takes off, the landing state signal is released by the push switch, and the second charging terminal enters the landing gear by the servo motor. Further, when the unmanned aerial vehicle 100 takes off, the charging station 200 detects the takeoff of the unmanned aerial vehicle 100 by the proximity sensor 240 and inactivates a charging power supply, so that the power supply enters into a standby state.

The exemplary embodiment of the present invention has been disclosed for illustrative purposes, and those skilled in the art will appreciate that various changes, modifications, and additions are possible within the scope and spirit of the invention, and it shall be considered that the changes, modifications, and additions are included in the accompanying claims.

What is claimed is:

1. An unmanned aerial vehicle, comprising:
   a main body which includes a plurality of rotors, and is capable of flying and vertical taking off and landing by the rotors;
   a battery which is mounted in the main body for supplying power and is chargeable;
   a landing gear which includes a first charging terminal and a second charging terminal having different polarities and electrically connected to the battery, and is provided at a lower part of the main body; and
   a controller configured to control the main body,
   wherein one or more charging terminals are provided to be accommodated inside the landing gear or protrude to the outside of the landing gear by a driving unit,
   wherein the first charging terminal is provided on a bottom surface of the landing gear, and the second charging terminal is provided to be accommodated inside the landing gear or protrude to the outside of the landing gear,
   wherein the landing gear is provided with a push switch, and
   when the landing gear is in contact with a charging station, the controller controls the driving unit so that the second charging terminal protrudes to the outside of the landing gear.

2. The unmanned aerial vehicle of claim 1, wherein when the landing gear is separated from the charging station, the controller controls the driving unit so that the second charging terminal is accommodated inside the landing gear.

3. A system for automatically charging an unmanned aerial vehicle, comprising:
   an unmanned aerial vehicle; and
   a charging station configured to charge the unmanned aerial vehicle,
   wherein the unmanned aerial vehicle includes:
   a main body which includes a plurality of rotors, and is capable of flying and vertical taking off and landing by the rotors;
   a battery which is mounted in the main body for supplying power and is chargeable;
   a landing gear which includes a first charging terminal and a second charging terminal having different polarities and electrically connected to the battery, and is provided at a lower part of the main body; and a controller configured to control the main body, and
the charging station includes:
a first plate, on which the landing gear of the unmanned aerial vehicle is seated, and which is to be electrically connected with the first charging terminal;
a second plate, which is spaced apart from the first plate at a predetermined interval, and is to be electrically connected with the second charging terminal of the unmanned aerial vehicle passing through the first plate; and
a micom configured to supply power to each of the plates while the unmanned aerial vehicle is charged,
wherein one or more charging terminals are provided to be accommodated inside the landing gear or protrude to the outside of the landing gear by a driving unit,
wherein the first charging terminal is provided on a bottom surface of the landing gear, and the second charging terminal is provided to be accommodated inside the landing gear or protrude to the outside of the landing gear,
wherein the landing gear is provided with a push switch, and
when the landing gear is in contact with a charging station, the controller controls the driving unit so that the second charging terminal protrudes to the outside of the landing gear.

4. The system of claim 3, wherein when a voltage of the battery is equal to or smaller than a predetermined voltage, the controller controls the unmanned aerial vehicle to be returned to the charging station.

5. The system of claim 3, wherein the controller vertically lands the unmanned aerial vehicle to the charging station based on at least one element of position information about the charging station and image information about the charging station.

* * * * *